US006926235B2

(12) United States Patent
Ouellette et al.

(10) Patent No.: US 6,926,235 B2
(45) Date of Patent: Aug. 9, 2005

(54) RUNWAY-INDEPENDENT OMNI-ROLE MODULARITY ENHANCEMENT (ROME) VEHICLE

(75) Inventors: Richard P. Ouellette, Lakewood, CA (US); Aaron J. Kutzmann, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 75 days.

(21) Appl. No.: 10/600,400

(22) Filed: Jun. 20, 2003

(65) Prior Publication Data

US 2005/0029400 A1  Feb. 10, 2005

(51) Int. Cl.$^7$ ............................................... B64C 1/00
(52) U.S. Cl. ..................................... 244/120; 244/119
(58) Field of Search ..................... 244/36, 120, 117 R, 244/119, 137.4, 136; 446/34, 38, 66; D12/319, D12/345, 322, 326, 335, 339

(56) References Cited

U.S. PATENT DOCUMENTS

| | | | | |
|---|---|---|---|---|
| 1,780,812 | A | * | 11/1930 | Burnelli ...................... 244/131 |
| 4,379,533 | A | * | 4/1983 | Caldwell et al. .......... 244/118.1 |
| 4,417,708 | A | * | 11/1983 | Negri ........................ 244/45 R |
| 4,926,818 | A | | 5/1990 | Oppenheim et al. |
| 5,909,858 | A | * | 6/1999 | Hawley ....................... 244/36 |
| 5,975,464 | A | * | 11/1999 | Rutan ........................ 244/120 |
| 6,065,720 | A | * | 5/2000 | Ash et al. ................... 244/120 |
| 6,070,831 | A | * | 6/2000 | Vassiliev et al. ........... 244/120 |
| 6,112,513 | A | | 9/2000 | Catt et al. |
| 6,308,898 | B1 | | 10/2001 | Dorris, III et al. |
| 6,568,632 | B2 | * | 5/2003 | Page et al. ................... 244/36 |
| 6,708,924 | B2 | * | 3/2004 | Page et al. ................... 244/36 |
| 2003/0213870 | A1 | * | 11/2003 | Eakins et al. ............... 244/119 |

FOREIGN PATENT DOCUMENTS

GB          2070209 A  *  9/1981  ............. F41F 5/02

* cited by examiner

*Primary Examiner*—Peter M. Poon
*Assistant Examiner*—Timothy D. Collins
(74) *Attorney, Agent, or Firm*—Harness Dickey & Pierce P.L.C.

(57) ABSTRACT

A modular component set is configurable to form a plurality of flight capable platforms. A plurality of end pieces each has contiguously connected curved outer portions each longitudinally expanding from a tip to terminate at a blunt attachment face. Body members have opposed ends to receive the end piece blunt attachment face, and a rectangular shaped mid-portion having opposed walls. A plurality of task specific panels are each releasably connectable to one of the opposed walls. At least one of the body members with the end pieces joined at the opposed ends, and at least one of the task specific panels connected to one of the opposed walls form a minimum component set for each of the flight capable platforms.

27 Claims, 8 Drawing Sheets

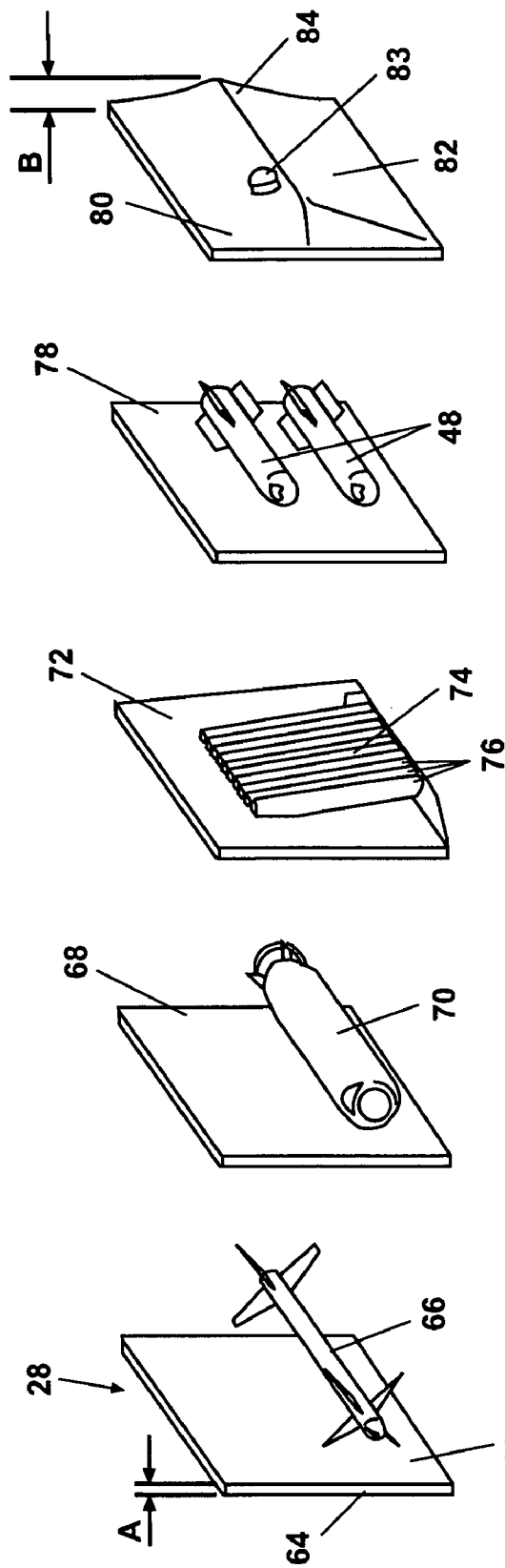

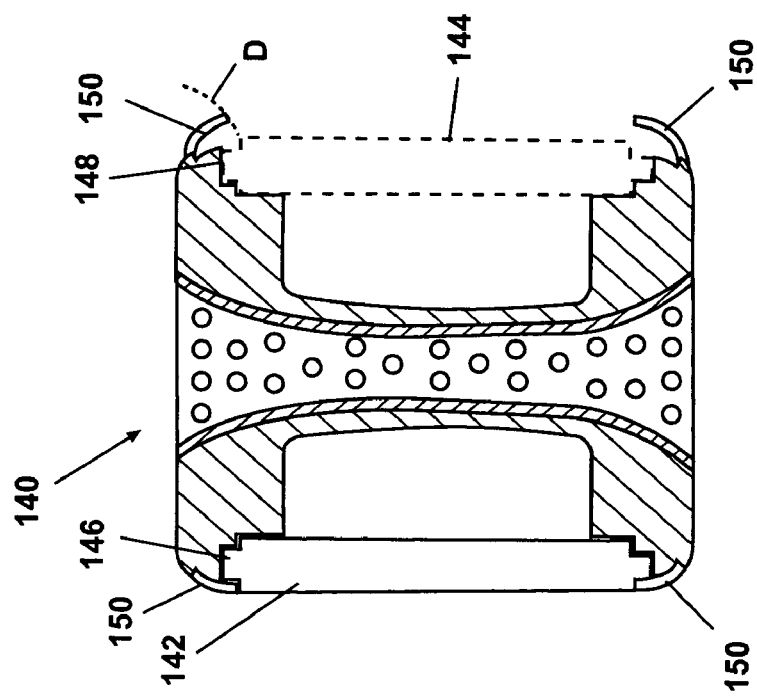
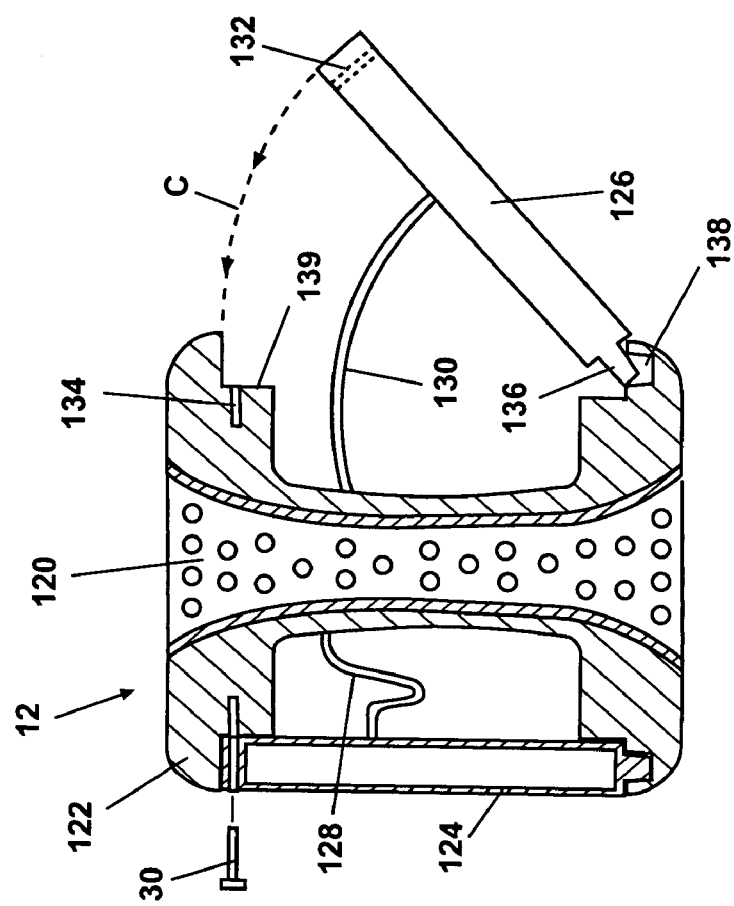

RUNWAY-INDEPENDENT OMNI-ROLE MODULARITY ENHANCEMENT (ROME) VEHICLE

FIELD OF THE INVENTION

The present invention relates generally to flight capable mobile platforms and more specifically to a modularly designed vertical or near-vertical takeoff aircraft.

BACKGROUND OF THE INVENTION

Current military doctrine relies on a limited number of high value assets to prosecute global events. The restriction to a one-man (or more) to one machine system severely impairs these finite forces' ability to overcome overwhelming hostile force numbers and/or engage several theatres of operation simultaneously. Additionally, a severe lack of commonality between the vehicles used by individual services of the armed forces has increased the cost of those platforms while restricting their interoperability between services and NATO allies.

The extremely complex and multiple part machinery used by the armed forces has several disadvantages. The initial cost to construct each unit is high. The follow-on cost to maintain each unit is also high due to the complexity of the systems in use. Additionally, highly complex machinery is more susceptible to damage and breakdown due to large numbers of moving parts, heavy reliance on software based computing systems for control and operation, and reliance on large numbers of highly trained maintenance personnel to maintain each vehicle.

For military use aircraft, either vertical takeoff/landing, or very short takeoff and landing aircraft are particularly complex and expensive systems both to procure and maintain. The advantage of short or vertical takeoff aircraft is a greatly reduced length for takeoff and/or landing strips, which enable broader use of the aircraft in areas lacking these facilities. This advantage is partially negated when one takes into account the susceptibility to damage of the system in unimproved areas and the relatively significant maintenance infrastructure the complex system requires.

It is therefore desirable to provide a modularly constructed aircraft to decrease the initial cost of each platform as well as to increase the number of and type of missions the aircraft can be modified to fly. It is also desirable to combine modular aircraft construction features with an aircraft having modularized and simplified vertical takeoff and landing propulsion devices.

SUMMARY OF THE INVENTION

According to a preferred embodiment of the present invention, a modular component set is configurable to form a plurality of flight capable platforms. A plurality of end pieces each have a shaped tip portion and contiguously connected curved outer portions each longitudinally expanding from the tip to terminate at a blunt attachment face. A plurality of body members have opposed ends adapted to receive the end piece blunt attachment face, and a rectangular shaped mid portion having opposed walls. A plurality of task specific panels are each releasably connectable to one of the opposed walls. At least one of the body members with the end pieces joined at the opposed ends, and at least one of the task specific panels connected to one of the opposed walls form a minimum component set for each of the flight capable platforms.

In one preferred embodiment, at least one vertical propulsion device is disposed in each of the body members. Two or more body members can then be joined either longitudinally or arranged in parallel sets. When parallel sets of the body members are formed, a payload bay is connectable between the two sets. A common nose/tail section is connectable to either end of each of the body members. Spacer members are used between parallel adjoining pairs of the nose/tail sections. One or more wing designs are mountable to the body members. Flight control surfaces are also mountable to either of the spacer members or the nose/tail sections.

The task specific panels of the present invention are releasably attached to walls of the body members. Each of the task specific panels can mount a different task item, including missiles, torpedoes, sonobuoys, rockets, radar, and additional items such as fuel and power sources, etc. The task specific panels are interchangeable between individual flights of the aircraft of the present invention. Control equipment, energy sources such as batteries, and mechanical connecting equipment are examples of equipment which can be mounted within an envelope of the task specific panels. Except for required aircraft interface equipment, each task specific panel therefore acts as a stand-alone module. Different types of equipment can also be loaded on opposite panels of a particular aircraft. The task specific panels are structurally integrated into the body member walls such that a portion of the load imparted by the task devices as well as the panel itself are integrated into the body members, and body member loads are also similarly transferable to or through the task specific panels.

Further areas of applicability of the present invention will become apparent from the detailed description provided hereinafter. It should be understood that the detailed description and specific examples are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4 is a perspective view of a task specific panel of the present invention showing an exemplary missile attached thereto;

FIG. 5 is a perspective view of an exemplary task specific panel showing a torpedo attached thereto;

FIG. 6 is a perspective view of an exemplary task specific panel showing a sonobuoy package attached thereto;

FIG. 7 is a exemplary task specific panel showing a pair of rockets attached thereto;

FIG. 8 is a perspective view of an exemplary task specific panel showing a radar module attached thereto and a modified exterior face providing additional volume for radar associated equipment;

FIG. 11 is a sectioned elevation view taken at Section 11—11 of FIG. 2, showing an alternate embodiment of the present invention;

FIG. 12 is a sectioned elevation view similar to FIG. 11, showing another embodiment of the present invention.

DETAILED DESCRIPTION OF THE PREFERRED EMBODIMENTS

The following description of the preferred embodiments is merely exemplary in nature and is in no way intended to limit the invention, its application, or uses.

Figure 1:
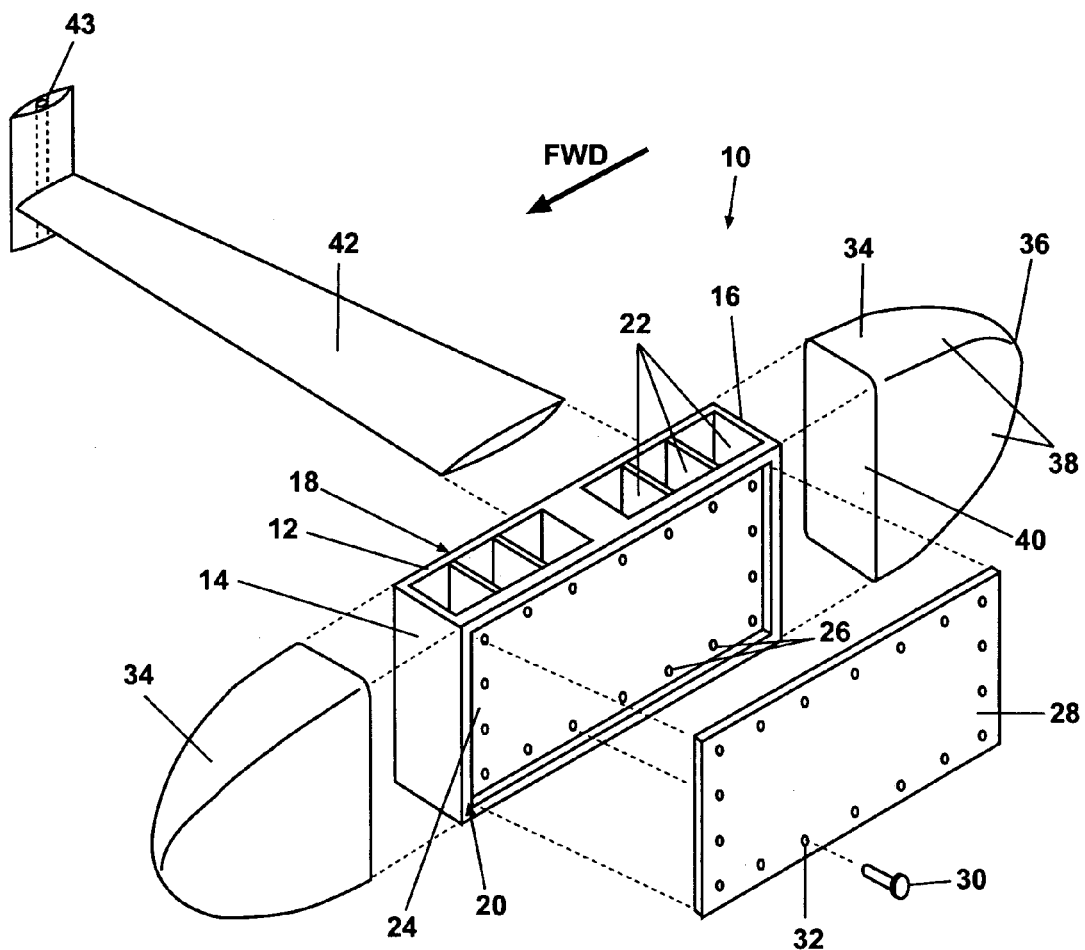
FIG. 1 is an exploded perspective view of modular aircraft according to a preferred embodiment of the present invention.

According to a preferred embodiment of the present invention, shown in FIG. 1, a mobile platform 10 in accordance with one preferred embodiment of the present invention is shown. The mobile platform 10 forms a modular aircraft, and will be referred to for convenience by the term "modular aircraft"10 herein. Modular aircraft 10 includes at least one body section 12 having a forward attachment face 14 and an aft attachment face 16. The body sections 12 each include a starboard wall 18 and a port wall 20, respectively. Each of the body sections 12 further includes at least one vertical propulsion device 22. FIG. 1 shows an exemplary set of six vertical propulsion devices 22, which in this example include augmented pulsejet engines. The augmented pulsejet engines are disclosed in co-pending U.S. patent application Ser. No. 10/245,519 commonly assigned to the assignee of the present invention, and entitled "Pulsejet Ejector Thrust Augmentor", filed Sep. 16, 2002, the disclosure of which is incorporated herein by reference.

Each body section 12 further includes a cavity 24 formed in each of the starboard wall 18 and the port wall 20. A plurality of fastener apertures 26 are shown around a perimeter of the cavity 24 (the port cavity is shown for clarity only). A task specific panel 28 is connectably fastened to each of the cavities 24 using each of a plurality of fasteners 30 which align through a plurality of apertures 32 in coalignment with each of the fastener apertures 26. The task specific panels 28 will be described in further detail in reference to FIGS. 4–8.

An end piece 34 is connectably joined to both the forward attachment face 14 and the aft attachment face 16 of the body section 12, using fasteners (not shown) or alternate attachment devices including adhesives, rivets, welding, and clips. Each end piece 34 includes a tip 36 and a plurality of contiguous rounded sides 38. Each of the rounded sides 38 ends at a blunt attachment face 40. The blunt attachment face 40 is dimensionally controlled to the approximate geometry and perimeter of each of the forward attachment face 14 and the aft attachment face 16 of body section 12. A starboard wing 42 and a port wing (not shown for clarity) are attached to the body section 12 at a location on either of the starboard wall 18 or the port wall 28 preferably above or optionally below the location of the task specific panels 28. Pulsejets 43 embedded in winglets of wings 42 can be differentially controlled for roll control. At least one of the body sections 12, at least two of the end pieces 34, and at least one of the task specific panels 28 connected to one of the starboard or port walls 18 and 20, respectfully, forms a minimum component set for the modular aircraft 10.

Figure 2:
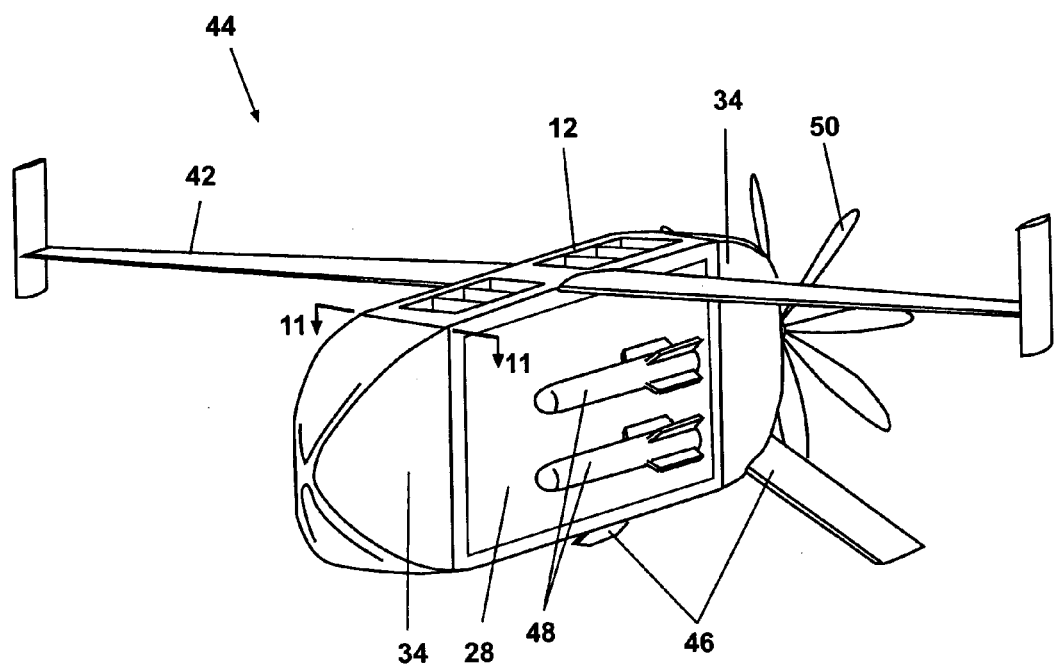
FIG. 2 is an assembled perspective view of the modular aircraft of FIG. 1 further showing an exemplary horizontal propulsion device and a task specific set of items mounted to the aircraft panel.

Referring next to FIG. 2, an assembled modular aircraft 44 using the basic parts identified in FIG. 1 and additional components is shown. Modular aircraft 44 includes a single body section 12 having a pair of end pieces 34 forming a forward or nose section and an aft or tail section, respectively. A pair of members 46 are connected to the aft located end piece 34. Each of the members 46 perform several functions, including acting as flight control surfaces for steering the modular aircraft 44 and as ground supporting members for the modular aircraft 44 when in a landed or stored position. The task specific panel 28 shown is modified to include a pair of rockets 48. Forward propulsion for the modular aircraft 44 is provided by a propeller 50. Engine components (not shown for clarity) connectable to the propeller 50 are disposed in the end piece 34 acting as the tail section of the modular aircraft 44. Fuel for the modular aircraft 44 is provided in either or both of the end pieces 34, as well as in excess volume located in body section 12 (e.g., area near wing attachment).

Modular aircraft 44 is envisioned as an unmanned aircraft, having internal flight guidance and control equipment (not shown) for remote flight control of modular aircraft 44. It should be obvious the size of modular aircraft 44 can be varied, depending on the size of the individual component parts and the desired mission of modular aircraft 44.

Figure 3:
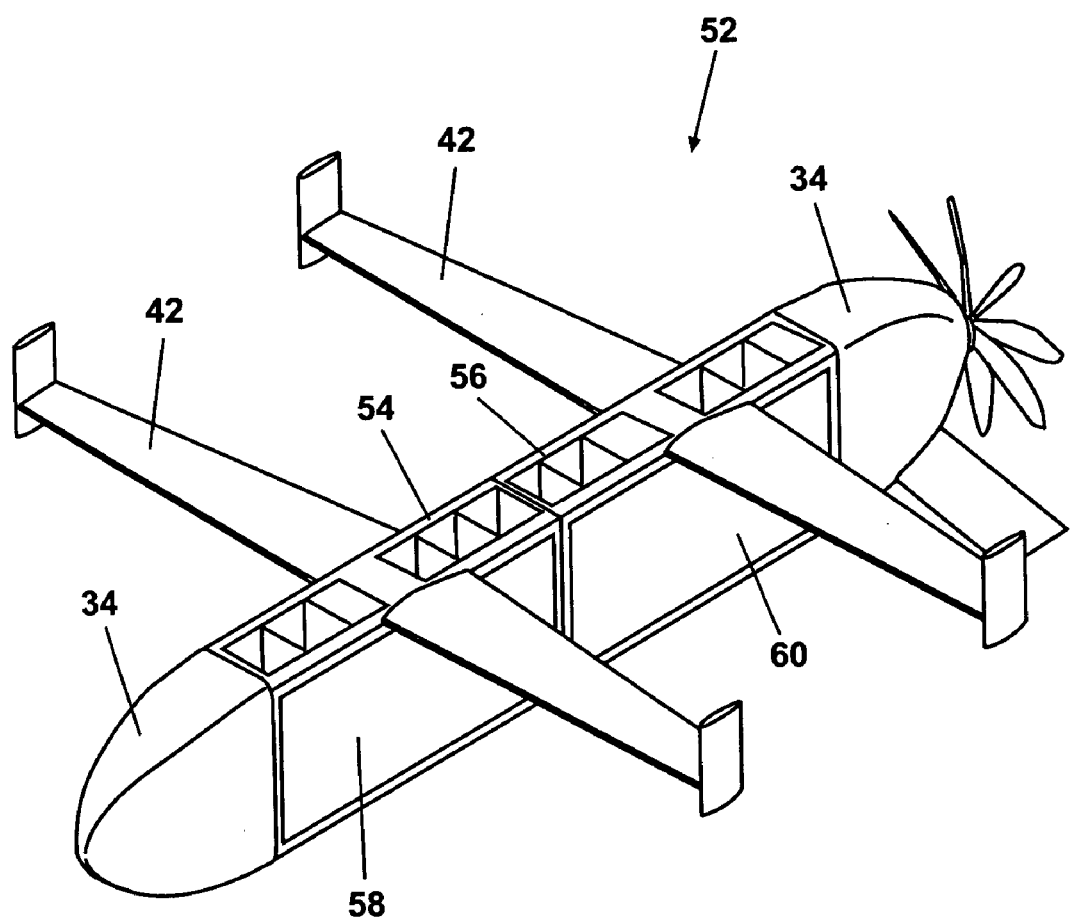
FIG. 3 is a perspective view of another embodiment of a modular aircraft of the present invention having a longitudinally joined pair of body sections and two separate pairs of wings.

Referring next to FIG. 3, a modular aircraft 52 according to another embodiment of the present invention is shown. Modular aircraft 52 includes a forward body section 54 and an aft body section 56, respectively, both similar to body section 12 described in reference to FIG. 1. Modular aircraft 52 is formed by joining forward attachment face 14 of aft body section 56 to aft attachment face 16 (shown in FIG. 1) of forward body section 54. By joining two body sections together in longitudinal alignment as shown, both a forward task specific panel 58 and an aft task specific panel 60 can be mounted to both sides of modular aircraft 52. Forward and aft ends of modular aircraft 52 are formed by end pieces 34, similar to those described in reference to FIG. 1. Modular aircraft 52 also includes two pairs of wings 42.

As best described in references to FIGS. 4–8, a plurality of task specific panels 28 are described. As shown in FIG. 4, an exemplary task specific panel 28 includes an exterior face 62 and an interior face 64. Exterior face 62 is modified to provide support for a missile 66. Each of the task specific panels 28 has a minimum panel depth "A." The function of panel depth "A" is to permit internal incorporation of electronics, guidance, fuel, and similar features required to interface with missile 66 or any equipment mounted to one of the task specific panels 28. Panel depth "A" approximately matches a depth of cavity 24 (shown in FIG. 1) such that each task specific panel 28 acts as a structural member when joined with the structure of body section 12.

As best seen in FIG. 5, a panel 68 is modified to support a torpedo 70. As shown in FIG. 6, a panel 72 is modified to support a sonobuoy package 74 which includes a plurality of sonobuoy delivery tubes 76. As best seen in FIG. 7, a panel 78 is modified to support the pair of rockets 48. As a further example of a task specific panel 28, FIG. 8 shows a panel 80 modified to incorporate an exemplary synthetic aperture radar module 82 and an electro-optical infra red camera 83. An exterior face 84 of panel 80 has an expanded panel depth "B" permitting incorporation of radar associated equipment (not shown) within the depth of panel 80. It should be obvious that FIGS. 4–8 represent exemplary designs for task specific panels 28. FIGS. 4–8 generally describe military applications for the task specific panels 28. Commercial and civilian uses for task specific panels 28 are also possible, including but not limited to, cameras for surveillance operation, weather-related radar equipment, support racks for carrying wounded personnel, crop spraying nuclear/biological/chemical detection, high value package delivery, and fish finding, etc. The invention is not limited to the devices mounted to a specific task specific panel 28. Each of the panels identified in FIGS. 4–8 (as well as panels not shown) are removably fastened to an aircraft of the present invention such that each flight of the aircraft can include a different task specific panel for a different operation of the aircraft.

Figure 9:
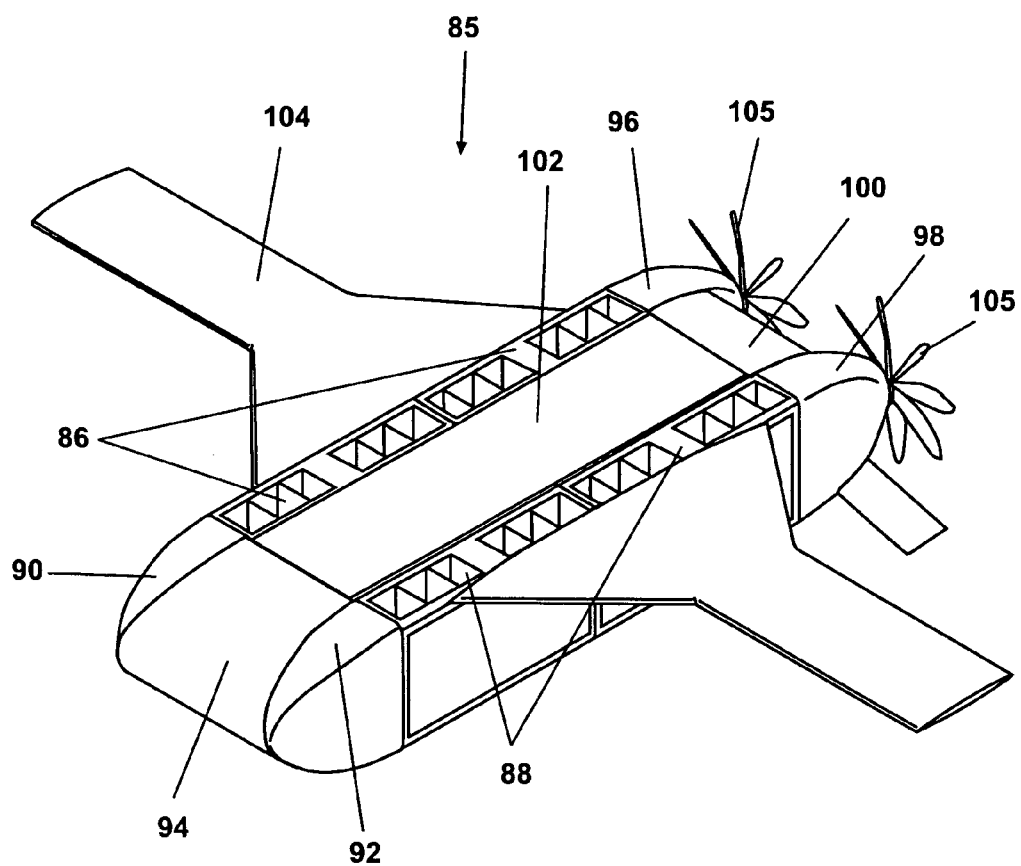
FIG. 9 is a perspective view of another embodiment of a modular aircraft of the present invention having multiple joined body sections, a payload bay, and spacer members attached thereto.

In a further preferred embodiment, and referring to FIG. 9, a modular aircraft 85 includes a starboard body section pair 86 and a port body section pair 88. Each of the starboard body section pair 86 and the port body section pair 88 are formed similar to the combination of forward body section 54 and aft body section 56 shown in FIG. 3. The starboard body section pair 86 and the port body section pair 88 are arranged in parallel. A forward starboard end piece 90 and a forward port end piece 92 are joined to the starboard body section pair 86 and the port body section pair 88 forward ends, respectively. A forward spacer member 94 is connectably disposed between forward starboard end piece 90 and forward port end piece 92. An aft end of modular aircraft 85 is similarly formed by an aft starboard end piece 96, an aft port end piece 98 and an aft spacer member 100. Providing each of the forward spacer member 94 and the aft spacer member 100 permits incorporation of a payload bay 102. Based on the increased size and operating weight of modular aircraft 85, an increased size wing pair 104 and a propeller pair 105 are incorporated therein. Similar to modular aircraft 52 shown in FIG. 3, modular aircraft 85 incorporates two task specific panels per side.

Figure 10:
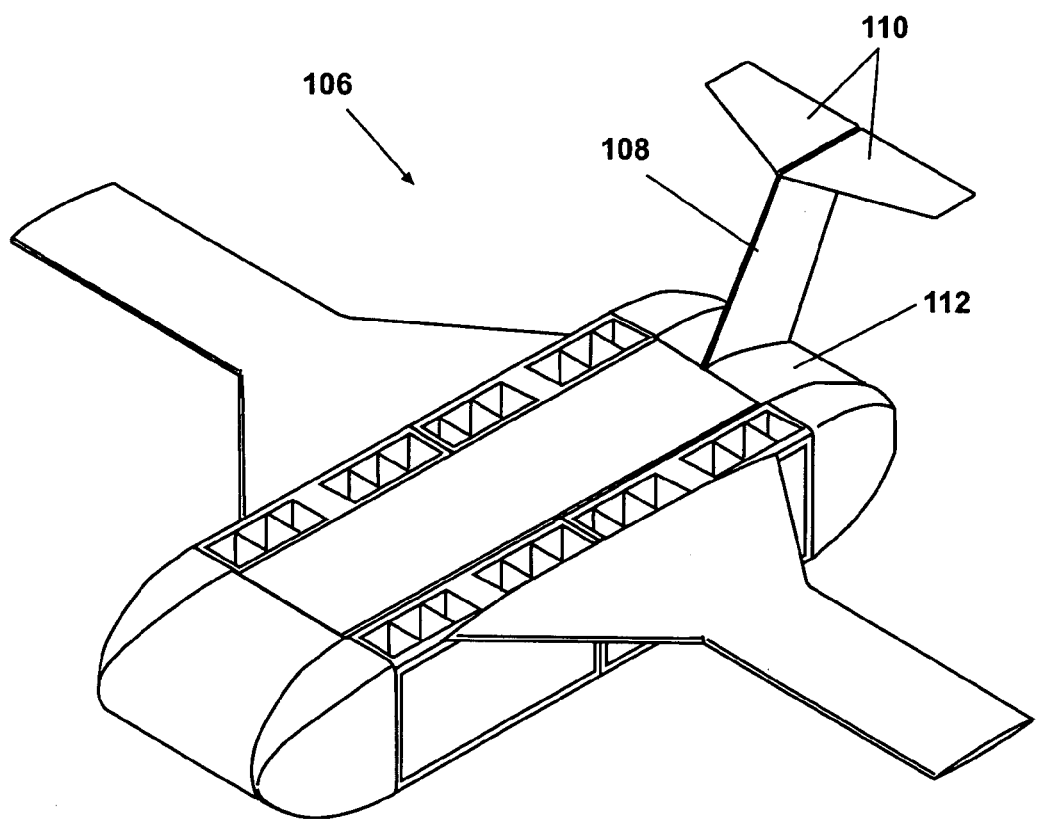
FIG. 10 is a perspective view similar to FIG. 9 showing an exemplary rudder and horizontal stabilizer pair attached to an aft spacer member.

Referring to FIG. 10, a modular aircraft 106 includes a rudder section 108 and a horizontal stabilizer pair 110 connectably disposed to an aft spacer member 112. Similar to modular aircraft 52 shown in FIG. 3, modular aircraft 106 incorporates two task specific panels per side.

For commonality, it is noted that the same geometry and construction features are incorporated in each of the end pieces 34, forward starboard end piece 90, forward port end piece 92, aft starboard end piece 96 and aft port end piece 98 respectively. Similarly, each of the forward body section 54, aft body section 56, starboard body section pair 86, and port body section pair 88 are formed from one or more body sections 12, shown and described in reference to FIG. 1. Each body section 12 is a generally rectangular shaped section incorporating at least one of the vertical propulsion devices 22. In one preferred embodiment, pulsejet ejector engines are used for vertical propulsion devices 22 in each body section 12. Alternate vertical propulsion sources can also be incorporated in body sections 12, including, but not limited to jet engines, rotating propeller sections, or rocket engines. Propellers are described herein for horizontal propulsion of modular aircraft of the present invention, however, alternate horizontal propulsion engines can also be used including jet engines, turbo jet engines, and pulsejet engines. Such horizontal propulsion engine(s) could occupy end piece(s) 34 or task specific panel(s) 28.

Referring to FIG. 11, a cross section through another embodiment of a body section 12 includes a pulsejet ejector thrust augmentor cavity 120 which is centrally positioned in a body structure 122. A task specific panel 124 and a task specific panel 126 are shown in each of an installed an a uninstalled position, respectively. A supply/support duct 128 supports task specific panel 124 and a supply/support duct 130 supports task specific panel 126, respectively. Each of the task specific panels 124 and 126 include a plurality of through-apertures 132 positioned at an upper position thereof. Each of the through-apertures 132 co-axially align with a fastener retention aperture 134 disposed in body structure 122. An exemplary installation of task specific panel 126 is as follows. The supply/support duct 130 is connected to task specific panel 126 and a tapered end 136 is slidably mated into a tapered slot 138 of body structure 122. Task specific panel 126 is rotated about panel installation arc C until the panel mates with a seating face 139. Each of a plurality of fasteners 30 are installed in through-apertures 132 to mate with each of the fastener retention apertures 134 to firmly attach the task specific panel 126. Task specific panel 124 is shown in its installed position.

Referring next to FIG. 12, another embodiment which is modified from that shown in FIG. 11 is provided. Only the differences between the embodiment shown in FIG. 11 and FIG. 12 will be discussed herein. Body section 140 supports a task specific panel 142 and a task specific panel 144 (shown in phantom). Each of the task specific panels 142 and 144 include an engagement end 146 at opposed ends of the task specific panels. Each engagement end 146 mates with a corresponding engagement slot 148 formed in body section 140. A plurality of rotational cams 150 are provided which are rotatably connected to body section 140 and rotate about cam rotation arc D from an open position (shown on the right side of FIG. 12) to a closed and latched position (shown on the left side of FIG. 12). Rotatable cams 150 are designed to engage each of the engagement ends 146 to firmly support both ends of task specific panels 142 and 144. Each task specific panel 142 and 144 can be loaded either horizontally (similar to the direction shown in FIG. 1) or alternately can be slid in a fore/aft direction through select ones of the end pieces 34 via openings (not shown) in the end piece 34. The openings can themselves be closed or sealed after installation of the task specific panel.

Figure 13:
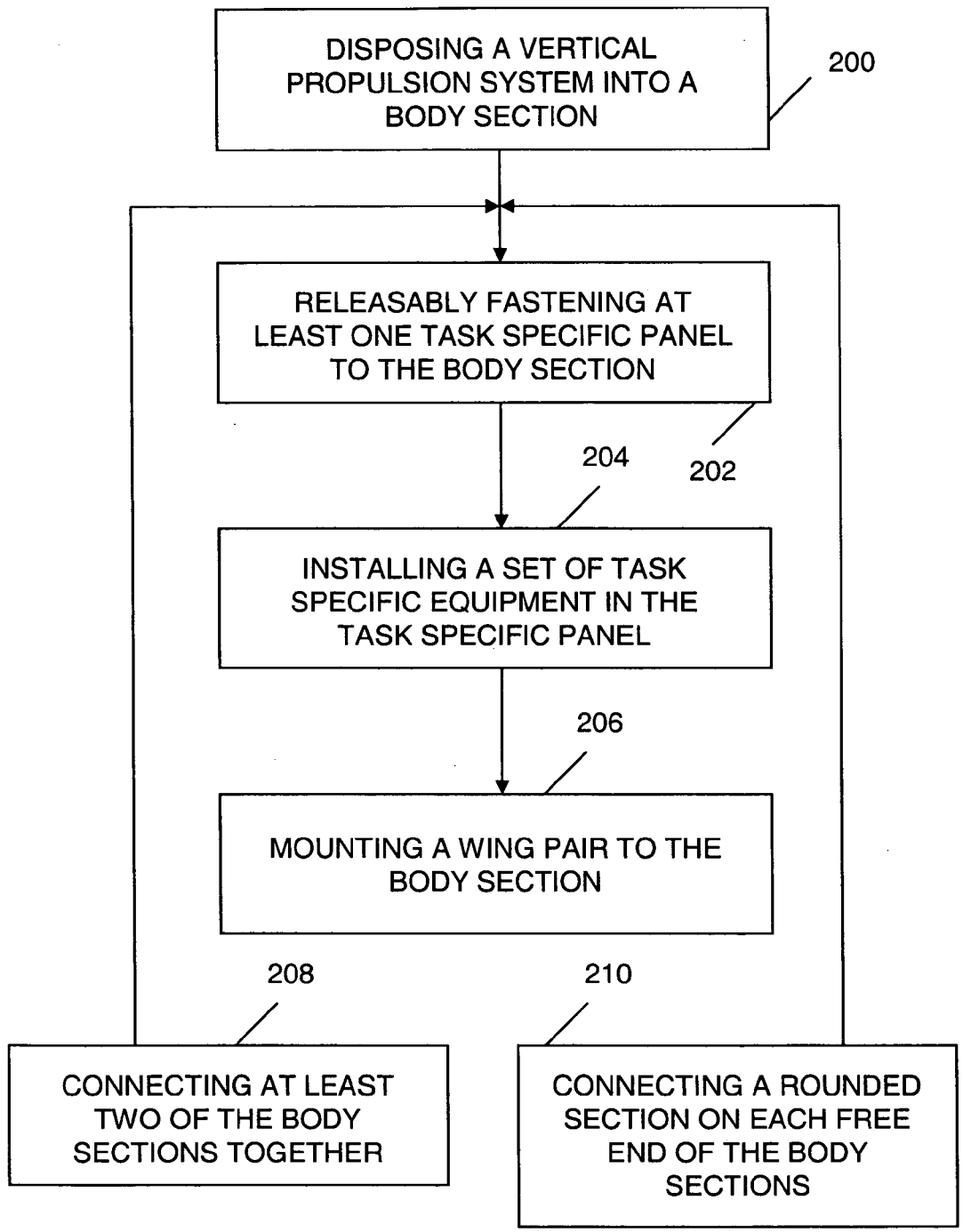
FIG. 13 is a flow diagram describing a method to modularly construct an aircraft of the present invention.

Referring finally to FIG. 13, the steps to construct a modular aircraft of the present invention are described. In a disposition step 200, a vertical propulsion system is disposed into a body section. At a fastening step 202, at least one task specific panel is releasably fastened to the body section. In an installation step 204, a set of task specific equipment is installed on each task specific panel. In a mounting step 206, a wing pair is mounted to the body section to form the aircraft of the present invention. In a first parallel step 208, at least two of the body sections are connected together. In a second parallel step 210, a rounded section or end piece is connected on each free end of the body sections.

A modular aircraft of the present invention offers several advantages. By incorporating vertical propulsion engines into common body sections, one or more body sections can be joined which provide a general fuselage shape for an aircraft design. By using a commonly shaped end piece, both forward and aft free ends of the body sections are provided with a commonly designed and installed end piece. By spacing two or more parallel aligned body sections, a payload bay can be incorporated as well as common spacer members between the end pieces. By incorporating task specific panels to the sides of each of the body members, each modular aircraft of the present invention can fly multiple missions after removal and reattachment of one of a plurality of mission specific equipment panels. The modular design of the present invention permits multiple uses including military, commercial and private for aircraft of the present invention. By incorporating control and electronic equipment supporting each package mounted from a task specific panel of the present invention, each task specific panel provides a self-contained unit of the necessary task specific equipment associated with the mission. Also, by utilizing aircraft flight control surfaces extending from an aft end of the aircraft as a simplified landing gear, a modular aircraft of the present invention can land and be reused for multiple missions. Maintenance on a modular aircraft of the present invention is also simplified because common component parts are used and are therefore replaceable if damaged or required for alternate missions.

Materials for a modular aircraft of the present invention are preferably of light weight and high strength. The end pieces are preferably constructed of an elastomeric (i.e., plastic) or fiber reinforced material such as fiberglass, or carbon fiber to minimize weight and provide an inexpensive, replaceable material. Similar materials are also preferably used for the spacer members as well as component parts of the payload bay. Due to the heat generated by the vertical propulsion engines and the need for strong/rigid load bearing structure, one preferred material for the body section(s) is a stainless steel or similar steel, or a metal or alloy which can both withstand the exhaust heat of the vertical propulsion engines and provide structural rigidity for mounting the various components, and supporting the wings of the modular aircraft of the present invention. Materials for the wings are similarly preferably manufactured of elastomeric or composite materials. It should also be noted, however, that the elastomeric materials referred to herein can be replaced by metals such as aluminum or titanium if desirable to provide a higher strength yet still light-weight modular aircraft.

It is anticipated that although most of the support equipment for a mission is incorporated in the task specific panel, some connectivity between the body section and the task specific panel may be required such as mechanical release mechanisms and/or electronic cabling to support location, guidance data, or fuel for a mission specific piece of equipment, which can be provided from the body section. It is also noted that the payload bay identified herein can be increased in size sufficient that a manned modular aircraft of the present invention can be provided. This will require some modification to the forward spacer member 94 (shown in FIG. 9), for example to include a windshield (not shown) for visibility. A landing gear set similar to that used for common military or commercial aircraft can also be incorporated in a modular aircraft of the present invention, particularly if manned flight is required.

A modular aircraft of the present invention, in one preferred form, may comprise a subsonic speed aircraft. The capability provided by the vertical propulsion engines provides each modular aircraft of the present invention with the advantage of a vertical or nearly vertical takeoff operation. This greatly increases the range of use for the modular aircraft of the present invention to areas where runways are not available as well as to those areas where runways are available. The preferred use of pulsejet ejector engines in a vertical takeoff aircraft is disclosed in co-pending U.S. patent application Ser. No. 10/245,145 commonly assigned to the assignee of the present invention, and filed on Sep. 16, 2002, the disclosure of which is incorporated herein by reference. The use of pulsejet ejector engines in vertical takeoff aircraft permits a low cost, low maintenance modular aircraft of the present invention both a vertical takeoff and landing capability as well as a limited hovering capability.

A modular aircraft as described herein is exemplary in that the invention can be applied to any mobile platform, and particularly to any flight capable mobile platform. The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An aircraft having a body constructable from a plurality of interchangeable modular parts, the aircraft body comprising:
   a plurality of substantially identical end pieces each having a blunt attachment face;
   at least one substantially rectangular shaped body member including a mid-portion having opposed walls and both forward and aft attachment faces each connectably receiving the blunt attachment face of one of the end pieces; and
   at least one task specific panel releasably attached to one of the opposed walls;
   wherein the forward attachment face and its associated end piece operably create a forwardmost section of the aircraft and the aft attachment face and its associated end piece operably create an aftermost section of the aircraft.

2. The aircraft of claim 1, wherein the blunt attachment face of each of the end pieces is substantially rectangular shaped and each of the end pieces further comprises a plurality of curved contiguously joined sides converging at a distal tip.

3. The aircraft of claim 1, wherein the body member further comprises at least one propulsion device dedicated for production of vertical propulsion.

4. The aircraft of claim 1, wherein one of the end pieces is adaptable to receive a propulsion device dedicated for production of horizontal propulsion.

5. The aircraft of claim 1, further comprising:
   a pair of the body members; and
   a payload bay connectable between the body members, the payload bay having opposed exterior walls each connected to an inner facing wall of one of the opposed pair of the body members.

6. The aircraft of claim 5, further comprising:
   a first spacer member connectable between the end pieces of each forward section of the pair of body members; and
   a second spacer member connectable between the end pieces of each aft section of the pair of body members.

7. The aircraft of claim 1, wherein each task specific panel further comprises:
   a plate portion operably interfacing with the wall;
   a structural support portion attachable to the plate portion;
   a task specific item operably supported by the structural support portion; and
   a dedicated portion adaptable to contain at least one of an electronics package, a control package, a power supply package, and a data storage package in communication with at least the task specific item.

8. The aircraft of claim 1, comprising:
   opposed lift producing members each connectable to one of the opposed walls of the body member; and
   a landing gear set connectable to one of the body member and the end piece.

9. The aircraft of claim 1, comprising a plurality of flight control surfaces connectable to one of the end pieces.

10. An aircraft having a body constructable from a plurality of interchangeable modular parts, the aircraft body comprising:

at least one body member having a forward facing end, an aft facing end, and a generally rectangular shaped mid-portion having opposed walls;

a plurality of substantially identical end pieces, each having an aerodynamically shaped tip portion and a blunt, generally rectangular shaped attachment face for connection to the body member, wherein a first one of the end pieces is connectable by the blunt attachment face to the body member forward facing end and a second one of the end pieces is connectable by the blunt attachment face to the body member aft facing end the substantially identical end pieces being forwardmost and aftermost sections of the aircraft;

a task specific panel releasably connectable to one of the opposed walls; and at least one pulsejet engine adapted to provide substantially vertical propulsion disposed in each body member.

11. The aircraft of claim 10, wherein the task specific panel is fastenably connectable to one of the opposed walls.

12. The aircraft of claim 10, comprising a horizontal propulsion device adaptably supported by one of the end pieces.

13. The aircraft of claim 10, comprising a pair of the body members longitudinally joined at the aft facing end of a first one of the pair and the forward facing end of a second one of the pair.

14. The aircraft of claim 12, comprising first and second pairs of the body members, the pairs modified for longitudinally joining between respective aft facing ends of the body members of the first pair and the forward facing ends of the body members of the second pair, the body members within each pair arranged in parallel alignment to each other.

15. The aircraft of claim 14, comprising
a payload bay connectable between the first and second pairs of the body members;
a first spacer member connectable between the forward facing ones of the end pieces of the first pair; and
a second spacer member connectable between the aft facing ones of the end pieces of the second pair.

16. The aircraft of claim 10, further comprising a wing connectable to each of the opposed walls.

17. The aircraft of claim 16, comprising a set of flight control surfaces connectably disposed to the second one of the end pieces.

18. The aircraft of claim 15, comprising opposed pairs of wings each connectable to an outermost facing one of the opposed walls.

19. The aircraft of claim 15, comprising a flight control surface connected to each of the aft facing ones of the end pieces of the second pair.

20. A method for constructing an aircraft having a body from a plurality of modular, interchangeable parts, the method comprising:
disposing a vertical propulsion system into a body section having opposed walls;
connecting one of an identical plurality of end pieces using a blunt attachment face of the end pieces to each of a forward and an aft end of the body section operable to create each of an aircraft forwardmost and aftermost end respectively; and
releasably fastening at least one task specific panel to at least one of the opposed walls of the body section;
installing a set of task associated control equipment in the task specific panel.

21. The method of claim 20, further comprising adapting the vertical propulsion system to include a plurality of pulsejet engines.

22. The method of claim 20, further comprising disposing a horizontal propulsion system at one of the end pieces.

23. The method of claim 20, further comprising:
longitudinally linking a plurality of the body sections to form a body side;
parallel aligning a pair of the body sides; and
installing a payload bay between the pair of body sides.

24. The method of claim 23, comprising:
connecting a first spacer onto a forward facing end of each of the body sides; and
attaching a second spacer onto an aft facing end of each of the body sides.

25. The method of claim 20, comprising connecting at least one flight control element to one of the end pieces.

26. The method of claim 20, comprising:
mounting a set of task specific equipment to the task specific panel; and
communicatively linking the task specific equipment to the task associated control equipment.

27. The method of claim 20, comprising switching between a plurality of task specific panels and a plurality of task specific equipment between individual flights of the mobile platform.

* * * * *